May 1, 1951  H. G. WEISMUELLER  2,550,895
ROTARY DISK FRUIT AND VEGETABLE COMMINUTOR WITH
INTERCHANGEABLE DISKS
Filed Jan. 28, 1949  3 Sheets-Sheet 1
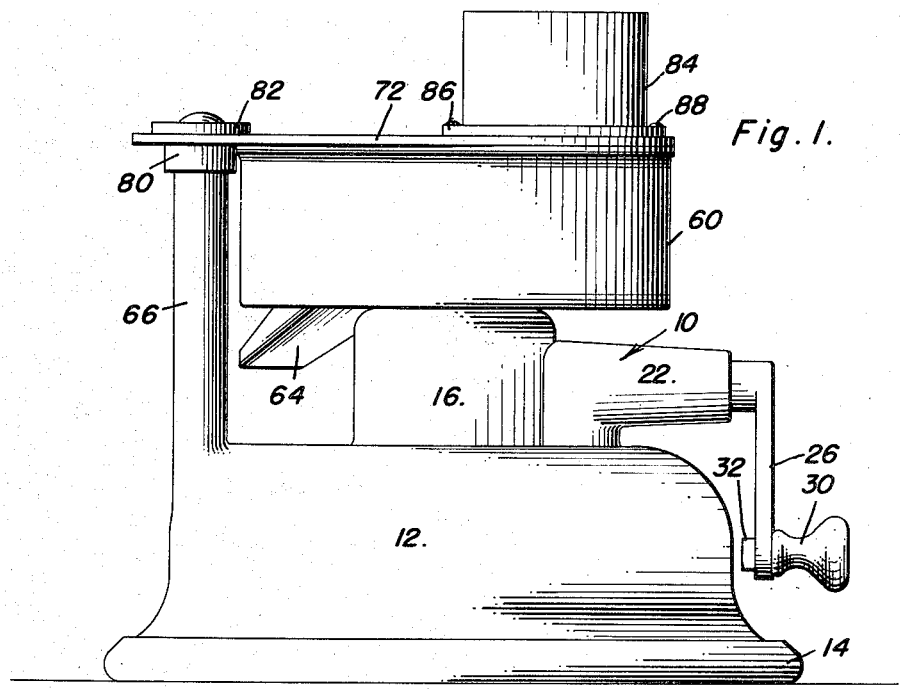
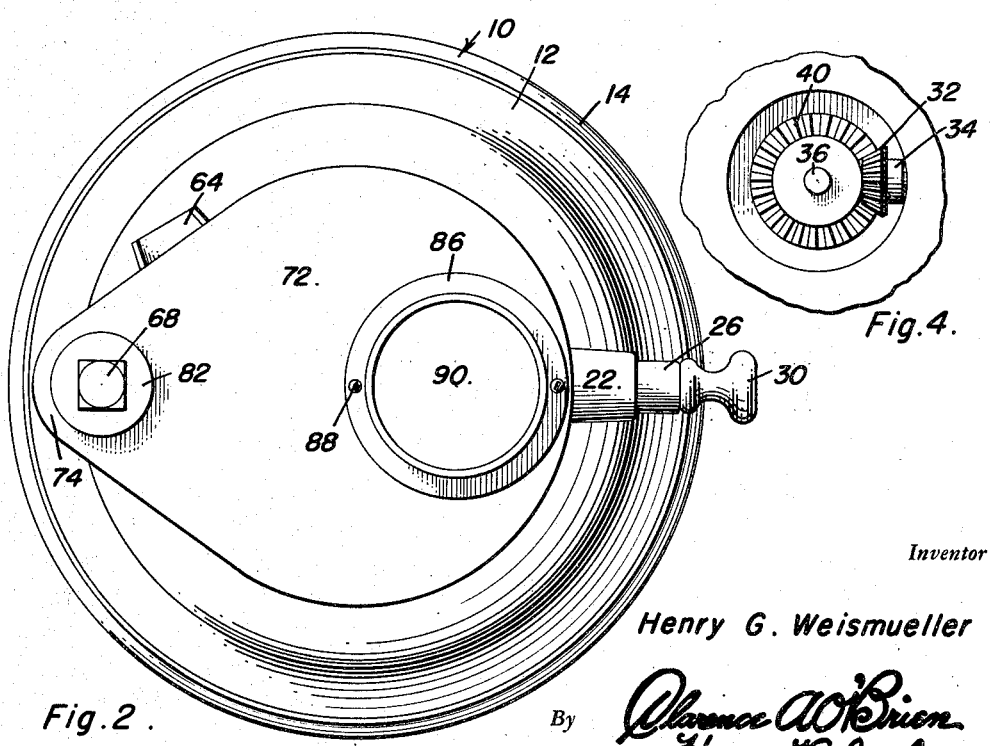
Inventor
Henry G. Weismueller
By *Clarence A. O'Brien and Harvey B. Jackson*
Attorneys May 1, 1951 H. G. WEISMUELLER 2,550,895
ROTARY DISK FRUIT AND VEGETABLE COMMINUTOR WITH
INTERCHANGEABLE DISKS
Filed Jan. 28, 1949 3 Sheets-Sheet 2

Inventor
Henry G. Weismueller

May 1, 1951  H. G. WEISMUELLER  2,550,895
ROTARY DISK FRUIT AND VEGETABLE COMMINUTOR WITH
INTERCHANGEABLE DISKS
Filed Jan. 28, 1949  3 Sheets—Sheet 3
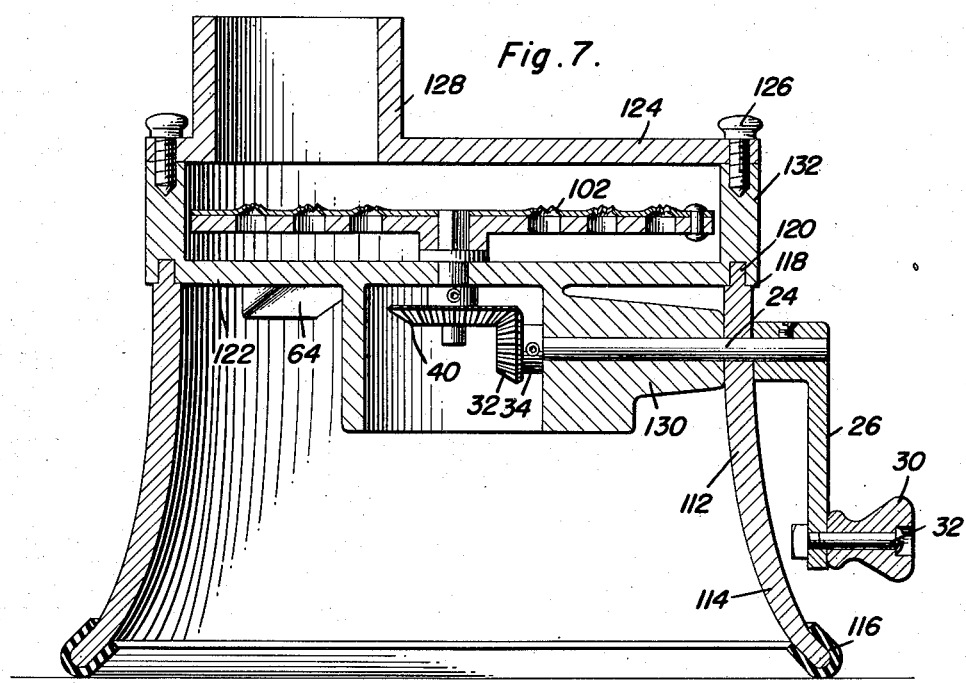
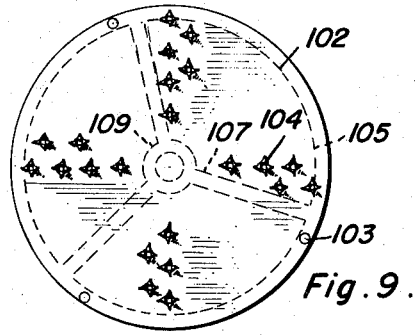
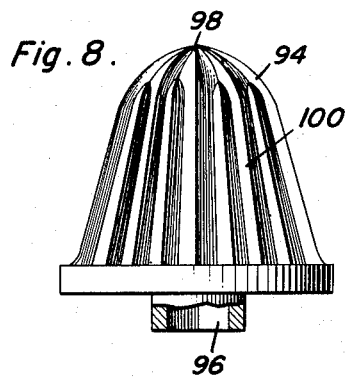
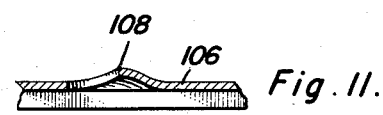
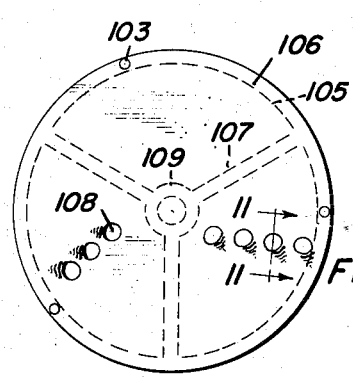
Inventor
Henry G. Weismueller
By *Clarence A. O'Brien and Harvey B. Jacobson*
Attorneys Patented May 1, 1951

2,550,895

UNITED STATES PATENT OFFICE 2,550,895

ROTARY DISK FRUIT AND VEGETABLE COMMINUTOR WITH INTERCHANGEABLE DISKS

Henry G. Weismueller, Milwaukee, Wis.

Application January 28, 1949, Serial No. 73,296

2 Claims. (Cl. 146—124)

This invention relates to a rotary centrifugal machine for pulverizing liquid bearing food products and for extracting the liquid from the pulverized food product, for extracting juice from various types of vegetables and fruits, for macerating fruits and vegetables, for slicing, grating and otherwise shearing and breaking down the cellular structure of various types of foods.

The primary object of this invention is to provide a device, which is easily transformed and modified for various uses, as for grating, slicing, extracting juice and pitting fruits.

Another object of this invention is to provide a rotary centrifugal machine that is adapted for grating, slicing, juicing and other uses and which embodies but few operating parts and may be readily and quickly assembled and disassembled for the use desired and which is portable and compact in weight but sturdily and dependably constructed.

Another object of this invention is to provide an interchangeable device, adapted for various and ancillary purposes, which may be used by an individual householder to perform any type of operation with respect to fruits and vegetables, to produce juices from all sorts of fruits or vegetables and to grate, slice or otherwise act upon food.

With these and ancillary objects in mind, as will appear hereafter, this invention comprises the novel parts, the novel combination and arrangement thereof, as shown in the accompanying drawings and described in the following specification.

In the accompanying drawings, there is shown a preferred embodiment of the instant invention and with respect thereto;

Figure 1 is a side elevational view of one embodiment of this invention;

Figure 2 is a top plan view thereof;

Figure 4 is a fragmentary sectional view taken on line 4—4 of Figure 3;

Figure 7 is a sectional view of another embodiment of this invention;

Figure 8 is an elevational view of the juicer head;

Figure 9 is a plan view of a grating disk;

Figure 10 is a plan view of the cutting and pitting disk, and,

Figure 11 is a sectional view taken on line 11—11 of Figure 10.

Figure 3:
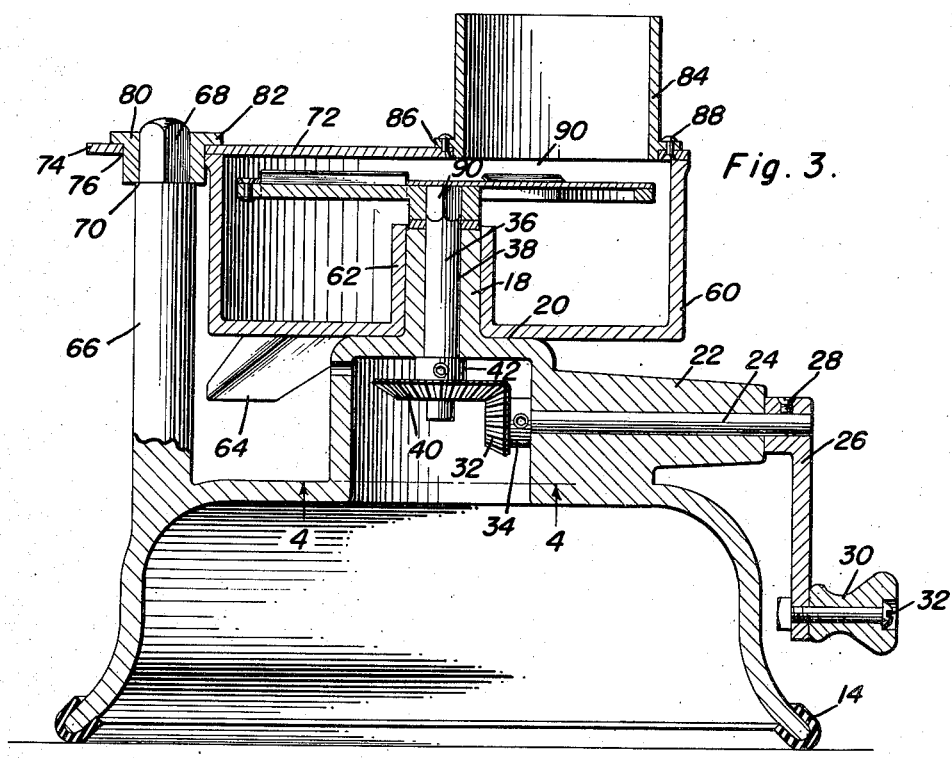
Figure 3 is a vertical sectional view.

Referring now more particularly to the drawings, and with particular reference to the embodiment illustrated in Figures 1-6, it is to be noted that the same comprises a lower bell-shaped supporting section or base 12, having a ring-like U-shaped flexible cushioning member 14 disposed at its bottom edge. The bell-shaped base forms a part of a casting 10, having a circular body portion 16 which extends upright centrally from the base. The body section 16 is provided with an upstanding coaxially reduced head portion 18, defining an annular shoulder 20. Extending laterally from the body section is an integral sleeve-like member 22. A driving shaft 24 is rotatably journaled in the sleeve-like member 22 and an arm 26 is frictionally secured by means of a set screw 28 on the outer end thereof. A knob 30 is secured by means of a nut and bolt assembly 31 to the extending outer end of the arm for rotating the shaft 24. A beveled gear 32 is fixed on the inner end of the shaft 24, which terminates within the body section 16. The gear is spaced from the inner side wall of the body section by means of a bearing assembly 34. A driven shaft 36 is vertically disposed within a centrally positioned vertically extending bore 38 formed in the head portion 18 of the body section. A beveled gear 40 is fixed on the lower extremity of the shaft in intermeshing relation with the gear 32, a bearing assembly 42 spacing the same from the upper wall of the body section. Thus, it is noted that by turning the hand crank, the desired rotation can be imparted to the shaft 36 and to the implement secured thereto, as will be later described.

Figure 5:
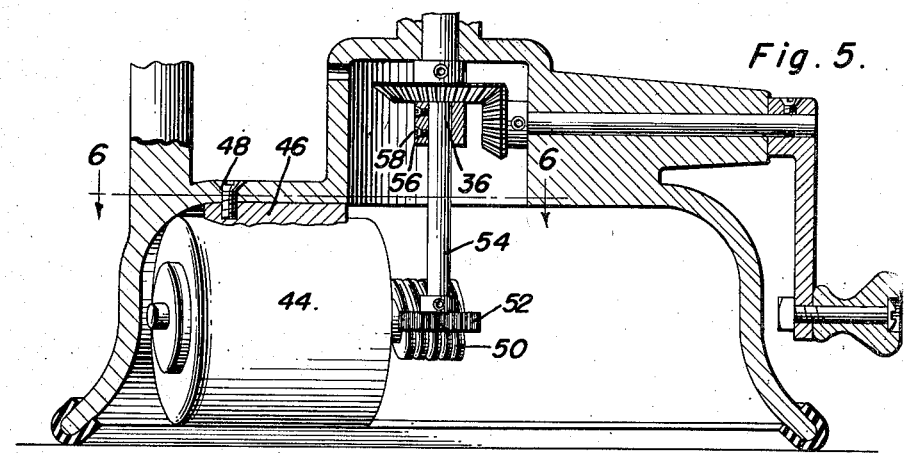
Figure 5 is a vertical sectional view, illustrating the means for operatively associating a motor with the operating structure.
Figure 6:
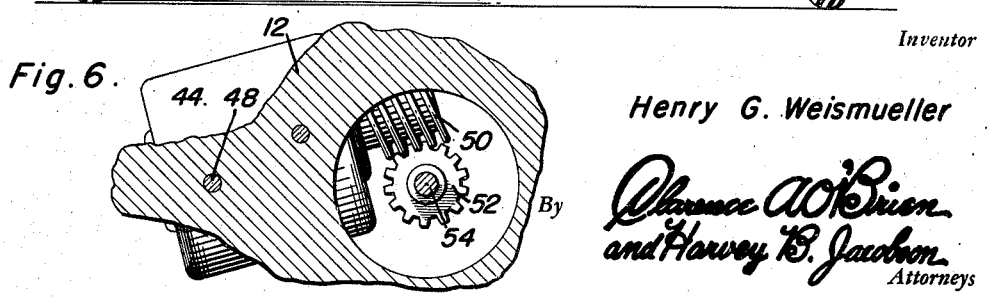
Figure 6 is a fragmentary sectional view taken on line 6—6 of Figure 5.

With respect to Figure 5, it is to be noted that an electric motor 44 is provided and the base plate 46 thereof is secured by means of conventional fastening elements 48 to the base section. Thus, the motor is securely mounted in a concealed placement within the base section. A worm 50 is disposed on the armature shaft of the motor in engagement of a gear 52 secured on the lower extremity of the vertically disposed shaft 54. The shaft 54 is drivingly connected with the driven shaft 36 by means of a coupling collar 56, frictional fastening means, such as set screws 58 being engaged with the shafts 36 and 54 for operatively locking the same together.

A bowl or receptacle 60 is formed with a centrally disposed upwardly extending integral sleeve 62, the latter being adapted for concentric disposition about the head portion 18, as the bowl is seated on the shoulder 20 of the body section. The bowl is formed with a delivery trough 64 which extends downwardly and outwardly therefrom and is adapted to lead liquids or semi-liquids or grated and macerated foodstuffs from the bowl or receptacle. A post 66 integrally extends upwardly from the base section and terminates in a multi-sided reduced upper end 68 defining an annular shoulder 70. A cover plate or top plate 72 is adapted for horizontal positioning in closure relationship with the bowl. The plate is formed with a reduced extending end 74 having an aperture 76 formed therein. The apertured end is adapted for placement on the upper end of the post, with a locking insert or sleeve 80 provided for locking the plate on the post. It is to be noted that the sleeve is provided with an upper laterally extending annular flange 82 adapted to engage the plate and retain the same on the post. A tubular hopper 84 is formed adjacent its lower edge with an annular attaching flange 86, which is secured to the plate by means of rivets 88 or other suitable means, the plate being formed with an opening 90, adapted to receive the hopper. The upper end of the driving shaft terminates in a multi-sided attaching extremity or square head 92 and is adapted to drivingly support various types of food devices, such as graters, extractors, cutters and pulverizers. Thus, with attention directed to Figure 8, a conical shaped grating drill or reamer 94 is formed with a depending square socket 96 adapted for detachable disposition on the square head. The drill terminating at its minor end in a blunt point 98 has a plurality of circumferentially spaced vertical teeth 100 distributed uniformly in its periphery. When the drill is positioned on the head 92, the cover 72 and appurtenant hopper being first removed, the same is rotated by the shaft 36. Accordingly, when the drill is in operation, fruit halves will be positioned thereon and pressed thereupon by an operator and the fruit juice and pulp will be reamed therefrom and collected in a receptacle disposed below the discharge spout 64.

A grating disk 102 is also formed with a socket for attaching the same to the driving shaft 36, the disk being formed with radially disposed and spaced series of punched out sections 104. The disk 102 is secured by rivets 103 onto a circular frame 105, which is reinforced by radial spokes 107 extending from a hub 109, which is formed with a square socket.

A cutting or slicing disk 106, as shown in Figure 10, can be substituted for the grating disk by placing the depending socket portion thereon of the head of the shaft 36. The disk 106 is formed with radially extending integral blades 108 in the conventional manner and is secured on a framework, as aforedescribed.

A modified form of housing is illustrated in Figure 7, wherein it is to be noted that the same includes a cylindrical body section 112 having an outwardly flared base 114, upon which is secured a rubber edging 116. An upper section 132 is secured on the upper edge 118 of the body section by a mortise and tenon joint 120, or other conventional tongue and groove means for securing two edges together. A discharge spout 64 is carried integrally by the bottom wall 122 of the upper section. A cover lid 124 is detachably seated on the upper edge of the upper section and secured thereon by fastening members 126. A hopper 128 is formed integral with the cover lid. The drive shaft 24 extends laterally through the wall of the body section and is rotatably housed in an offset section 130 formed integrally with the bottom wall of the upper section. The drive shaft and other operating structure is similar to that shown in Figure 1.

In operation, it can be seen that the various grating, cutting, and reaming devices, being formed with square attaching sockets can be operatively secured on the square head of the driven shaft and rotated thereby either through manual power or the motor 44. Of course, the particular device employed and the particular operation thereof will determine the use of the cover and hopper, as the same will usually be employed to form a housing or closed receptable for food particles to be grated, sliced or the like. However, due to the adjustability of the device and the ease and convenience in which various food operating devices can be operatively associated and disassociated therewith, various different or similar operations may be successively performed.

However, while one embodiment of this invention has been shown, it is to be understood that certain other embodiments can be carried out, as coming within the spirit and scope of the appended claims.

Having described the invention, what is claimed as new is:

1. A device for preparing foodstuffs including a body section, a centrally disposed raised portion on said section, a non-circular upright bearing formed on said portion, a container having an open top mounted on the raised portion of the body section and having a centrally disposed vertical sleeve formed thereon and received on the bearing, a driven shaft journalled in said bearing, means formed on the upper end of the shaft for mounting shearing devices thereon, a cover lid for said container, a hopper formed on the lid, a discharge spout extending laterally from the container, a flange extending from the lid, a vertical post formed on the body section and means for detachably mounting the post in the flange to lock the lid on the container.

2. A device for preparing foodstuffs including a body section, a centrally disposed raised portion on said section, a non-circular upright bearing formed on said portion, a container having an open top mounted on the raised portion of the body section and having a centrally disposed vertical sleeve formed thereon and received on the bearing, a driven shaft journalled in said bearing, means formed on the upper end of the shaft for mounting shearing devices thereon, a cover lid for said container, a hopper formed on the lid, a discharge spout extending laterally from the container, a flange extending from the lid, a vertical post formed on the body section and means for detachably mounting the post in the flange to lock the lid on the container, said last means including a non-circular head on said post, a sleeve vertically carried by the flange and formed complementary to the head for mounting thereon.

HENRY G. WEISMUELLER.

REFERENCES CITED

The following references are of record in the file of this patent:

UNITED STATES PATENTS

| Number | Name | Date |
|---|---|---|
| 2,186,672 | Fromm | Jan. 9, 1940 |
| 2,295,922 | Weston | Sept. 15, 1942 |

FOREIGN PATENTS

| Number | Country | Date |
|---|---|---|
| 390,814 | Germany | Mar. 1, 1924 |